US011646622B2

(12) United States Patent
Lin et al.

(10) Patent No.: US 11,646,622 B2
(45) Date of Patent: May 9, 2023

(54) METHODS AND SYSTEMS FOR A STATOR WITH HELICAL WINDINGS CONFIGURED FOR USE IN ELECTRIC AIRCRAFT MOTOR

(71) Applicant: BETA AIR, LLC, South Burlington, VT (US)

(72) Inventors: Chenjie Lin, Fuquay-Varina, NC (US); Manon Danielle Belzile, Fairfield, VT (US)

(73) Assignee: BETA AIR, LLC, South Burlington, VT (US)

( * ) Notice: Subject to any disclaimer, the term of this patent is extended or adjusted under 35 U.S.C. 154(b) by 290 days.

(21) Appl. No.: 17/154,578

(22) Filed: Jan. 21, 2021

(65) Prior Publication Data

US 2022/0231561 A1 Jul. 21, 2022

(51) Int. Cl.
*H02K 3/38* (2006.01)
*B64D 27/24* (2006.01)
(Continued)

(52) U.S. Cl.
CPC ............... *H02K 3/38* (2013.01); *B64D 27/24* (2013.01); *H02K 1/2706* (2013.01); *H02K 3/02* (2013.01); *H02K 15/0435* (2013.01)

(58) Field of Classification Search
CPC ........ H02K 1/27; H02K 1/2706; H02K 15/04; H02K 15/0435; H02K 3/02; H02K 3/38; B64D 27/24
(Continued)

(56) References Cited

U.S. PATENT DOCUMENTS

| 4,563,606 A | 1/1986 | Fukasawa | |
|---|---|---|---|
| 5,334,899 A * | 8/1994 | Skybyk | H02K 9/19 310/268 |

(Continued)

FOREIGN PATENT DOCUMENTS

| DE | 4404585 A1 | 8/1995 |
|---|---|---|
| WO | 1989005538 | 6/1989 |

OTHER PUBLICATIONS

Reference Notes: https://arxiv.org/abs/1702.04261 Title: A New self-Propelled Magnetic Bearing With Helical Windings By: B Shayak Date: Feb. 14, 2017.

(Continued)

*Primary Examiner* — Rashad H Johnson
(74) *Attorney, Agent, or Firm* — Caldwell Intellectual Property Law (57) ABSTRACT

An electric propulsion assembly for an electric aircraft propulsor including an integrated stator assembly including a mandrel having an outer cylindrical surface, an inner cylindrical surface, an upper edge, and a lower edge, the mandrel includes a plurality of electrically insulating guide walls disposed on at least a portion of the outer cylindrical surface and at least a portion of the inner cylindrical surface, wherein the electrically insulating guide wall forms a path across the outer and inner cylindrical surfaces. Assembly includes a plurality of copper windings wound upon the mandrel, electrically insulating epoxy, wherein the epoxy envelops at least a portion of the plurality of copper windings, a first cylindrical surface facing the inner cylindrical surface including a permanent magnet array, a second cylindrical surface facing the outer cylindrical surface including a back iron and a void disposed between the first cylindrical surface and the second cylindrical surface.

20 Claims, 7 Drawing Sheets (51) Int. Cl.
  *H02K 15/04* (2006.01)
  *H02K 1/2706* (2022.01)
  *H02K 3/02* (2006.01)

(58) Field of Classification Search
  USPC .................. 310/208, 211, 214, 216.002
  See application file for complete search history.

(56) References Cited

U.S. PATENT DOCUMENTS

| | | | |
|---|---|---|---|
| 6,924,574 B2 | 8/2005 | Qu | |
| 7,145,280 B2* | 12/2006 | Noble | H02K 15/02 |
| | | | 310/180 |
| 7,269,890 B2 | 9/2007 | Nagano | |
| 7,750,521 B2 | 7/2010 | Qu | |
| 8,461,730 B2 | 6/2013 | Hench | |
| 8,884,490 B2 | 11/2014 | Meier | |
| 9,876,407 B2 | 1/2018 | Walsh | |
| 9,935,516 B2 | 4/2018 | Horng | |
| 11,208,206 B1* | 12/2021 | Auerbach | B64D 27/24 |
| 2008/0030096 A1* | 2/2008 | Mehta | H02K 3/28 |
| | | | 29/598 |
| 2009/0278647 A1 | 11/2009 | Buswell | |
| 2013/0119815 A1* | 5/2013 | Song | H02K 3/18 |
| | | | 310/208 |
| 2016/0380496 A1* | 12/2016 | Hunstable | H02K 21/26 |
| | | | 310/179 |
| 2018/0062486 A1* | 3/2018 | Agapiou | H02K 3/12 |
| 2020/0204049 A1* | 6/2020 | Zhong | H02K 15/028 |
| 2022/0029488 A1* | 1/2022 | Belzile | H02K 1/27 |

OTHER PUBLICATIONS

Reference Notes: https://www.mdpi.com/1996-1073/11/2/344 Title: Challenges and Opportunities of Very Light High-Performance Electric Drives for Aviation By: Henke Date: Feb. 2, 2018.

* cited by examiner

METHODS AND SYSTEMS FOR A STATOR WITH HELICAL WINDINGS CONFIGURED FOR USE IN ELECTRIC AIRCRAFT MOTOR

FIELD OF THE INVENTION

The present invention generally relates to the field of electric aircraft. In particular, the present invention is directed to methods and systems for a stator with helical windings configured for use in electric aircraft motor.

BACKGROUND

In electric multi-propulsion systems such as electric vertical take-off and landing (eVTOL) aircraft, the propulsors are constrained by volumetric, gravimetric, and thermal concerns. Design and assembly of the propulsor units must be done in a manner which reduces volumetric, gravimetric, and thermal issues to enable efficient flight. Existing approaches to mitigating these issues are limited.

SUMMARY OF THE DISCLOSURE

In an aspect An electric propulsion assembly for an electric aircraft propulsor the electric propulsion assembly including an integrated stator assembly, the integrated stator assembly including a mandrel having an outer cylindrical surface, an inner cylindrical surface, an upper edge, and a lower edge, the mandrel further comprising a plurality of electrically insulating guide walls disposed on at least a portion of the outer cylindrical surface and at least a portion of the inner cylindrical surface, wherein the electrically insulating guide wall forms a path across the outer and inner cylindrical surfaces. The electric propulsion assembly includes a plurality of copper windings wound upon the mandrel, electrically insulating epoxy, wherein the epoxy envelops at least a portion of the plurality of copper windings, a first cylindrical surface facing the inner cylindrical surface, the first cylindrical surface including a permanent magnet array, a second cylindrical surface facing the outer cylindrical surface, the second cylindrical surface including a back iron and a void disposed between the first cylindrical surface and the second cylindrical surface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
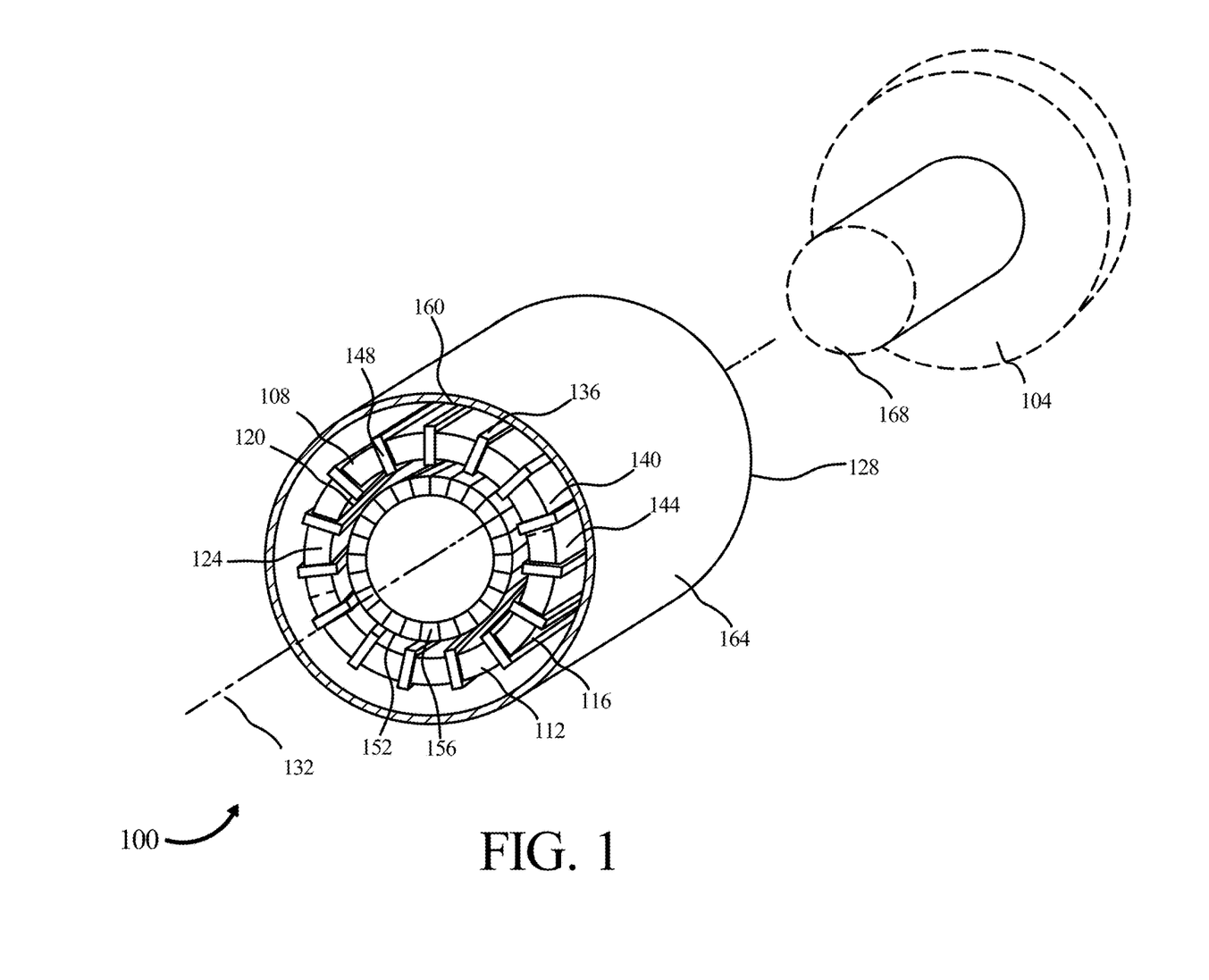
FIG. 1 is an illustration of an integrated electric propulsion assembly in isometric view.

Referring now to FIG. 1, an electric propulsion assembly 100 for an electric aircraft propulsor 104 is presented. Electric propulsion assembly 100 includes integrated stator assembly 108. Integrated stator assembly 108 includes mandrel 112 having outer cylindrical surface 116 and inner cylindrical surface 120. Mandrel 112 includes upper edge 124 and lower edge 128 which are opposite and opposing parallel faces. Outer cylindrical surface 116 and inner cylindrical surface 120 are coincident and parallel, sharing axis of rotation 132 at their respective center points. Inner cylindrical surface 120 includes a radius less than the radius of outer cylindrical surface 116. Inner cylindrical surface 120 and outer cylindrical surface 116 are connected at a first and second end which includes upper edge 124 and lower edge 128. upper edge 124 and lower edge 128 may be coincident with planes orthogonal to axis of rotation 132.

With continued reference to FIG. 1, mandrel 112 includes a plurality of electrically insulating guide walls 136. Guide walls 136 are disposed parallel to proximate guide walls and parallel along both inner cylindrical surface 120 and outer cylindrical surface 116. Guide walls 136 are disposed such that between guide walls 136 a path is disposed running from lower edge 128 to upper edge 124.

With continued reference to FIG. 1, mandrel 112 may include dielectric material. Dielectric material may include any material and/or combination of materials that acts as an electrical insulator; additionally, dielectric materials used herein may be any substance that is a relatively poor conductor of electricity but may support an electrostatic field. Dielectric material may include, without limitation, polymers or dielectric composites, amongst other materials. Persons skilled in the art, upon reviewing the entirety of this disclosure, will be aware of various forms of dielectric material that may be consistent with the described methods and systems. Mandrel 112 may be additively manufactured. One or more manufacturing processes may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, in this case, mandrel 112, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material. Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" (3D printing) processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional (3D) printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Continuing to refer to FIG. 1, mandrel 112 may be constructed from one single piece of stock material that has been subtractive or additively manufactured. Additionally, or alternatively, mandrel 112 may include first half-cylindrical component 140 and second half-cylindrical component 144. The first and second half-cylindrical component may permanently or temporarily be mechanically coupled together to form mandrel 112. Mandrel 112 may include more than two components, for example, mandrel 112 may include three third-cylindrical components. Mandrel 112 may include electrically insulating material. Electrically insulating, for the purposes of this disclosure, refer to a material's ability to impede the flow of electrical current through or over it.

Figure 2:
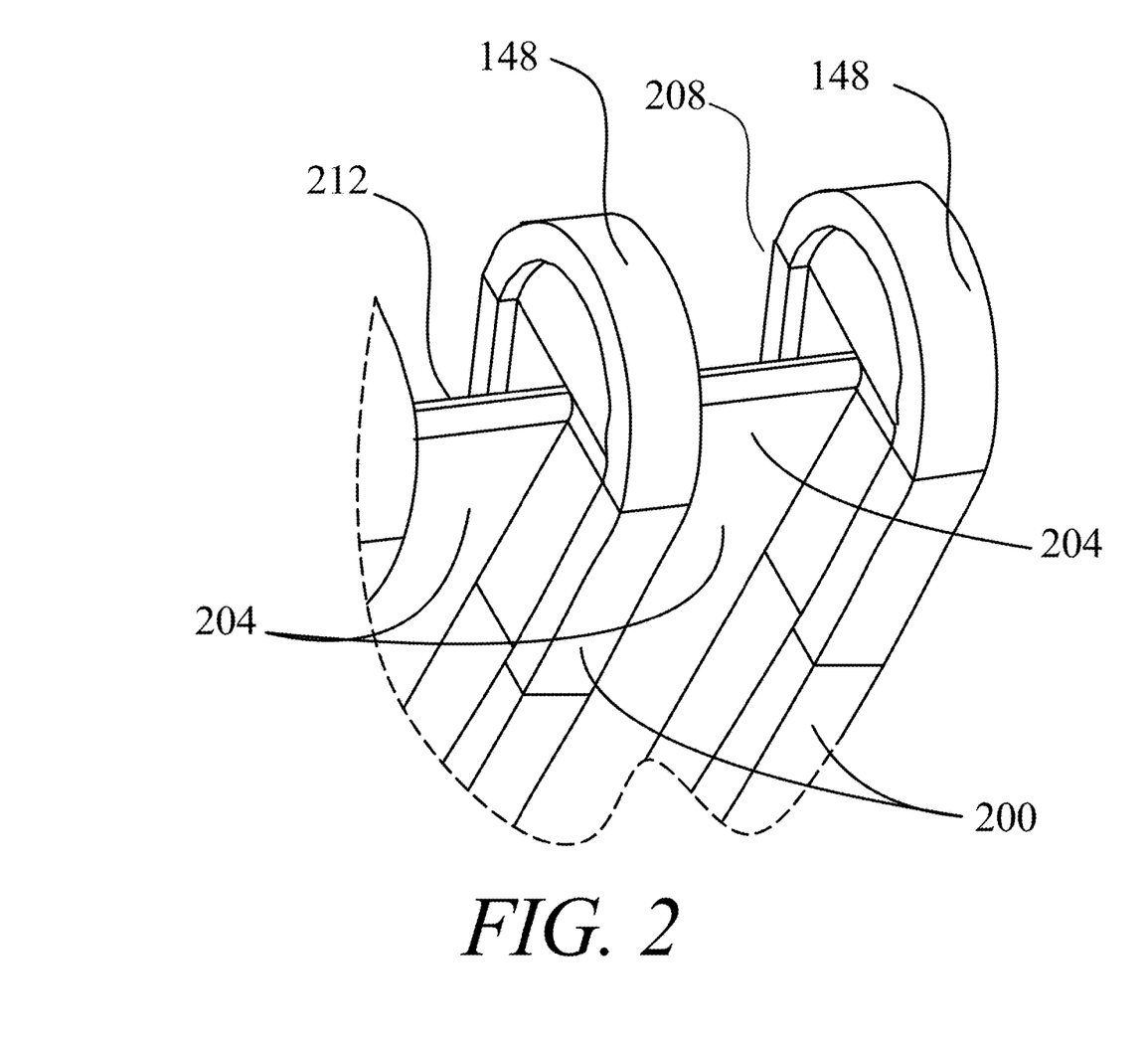
FIG. 2 is a close-up illustration of an embodiment of a mandrel.

Referring now to FIG. 2, close up of mandrel edge 200 is presented. Mandrel 112 may include dielectric separator tabs 148 disposed on upper edge 124 and lower edge 128 about the circumference of mandrel 112. Dielectric separator tabs 148 may be configured to electrically insulate adjacent windings from each other, consistent with the disclosure of windings hereinbelow. Mandrel 112 may include openings at a first end of mandrel and configured to facilitate windings through and around mandrel 112 consistent with the disclosure hereinbelow.

In non-limiting illustrative embodiments, first plurality of guide walls forming first plurality of channels 204 may extend outward from an upper edge 124 with a plurality of separator tabs 148, which may cause first plurality of guide walls 204 to join second plurality of guide walls 208 and second plurality of channels 212 on inner cylindrical surface 120, in a similar position opposite outer cylindrical surface 116. Alternatively, or additionally, plurality of separator tabs 148 may extend from lower edge 128; in other words first plurality of guide walls 200 forming first plurality of channels 204 may extend outward from a lower edge 128 for a second plurality of guide walls 208 forming a second plurality of channels 212.

Plurality of windings, which will be disclosed hereinbelow may be channeled in plurality of channels on both outer cylindrical surface 116 and inner cylindrical surface 120. Plurality of separator tabs 148 extending on upper edge 124 and lower edge 128 may secure windings over edges during the manufacturing process described herein, maintaining separation between turns of windings; plurality of extension tabs may be composed of any material and/or combination of materials suitable for composition of plurality of guide walls, including without limitation dielectric material for insulation between the windings, as described previously. The tabs described in the entirety of this disclosure may electrically insulate windings and/or phases from each other by physically separating the windings from contacting another and increasing resistance of electric current. A plurality of separator tabs 424 may be disposed at any point on mandrel 304 in an area where windings may be more or less likely to contact another winding or component in electric motor as a whole that may require electrical isolation. First or second plurality of guide walls may include a plurality of retention tabs, extending perpendicularly from a plurality of guide walls, covering a section of a plurality of channels. Plurality of retention tabs may function to keep a plurality of windings 304 secured in the plurality of channels during the winding of a mandrel 112. Plurality of retention tabs may extend orthogonally from plurality of guide walls forming the channels for a plurality of windings 304, and the plurality of retention tabs may extend from the plurality of guide walls at any section and at more than one section. As further illustrated in FIG. 2, a turn of a plurality of windings 304 secured in a first plurality of channels 204 is shown in black on inner cylindrical surface 120 and in dashed lines on an outer cylindrical surface 116. The plurality of extension tabs may be composed of any material and/or combination of materials suitable for composition of plurality of guide walls, including without limitation dielectric material for insulation between the windings, as described previously. The tabs described in the entirety of this disclosure may electrically insulate windings and/or phases from each other by physically separating the windings from contacting another and increasing resistance of electric current. A plurality of separator tabs 148 may be disposed at any point on mandrel 112 in an area where windings may be more or less likely to contact another winding or component in electric motor as a whole that may require electrical isolation.

Figure 3:
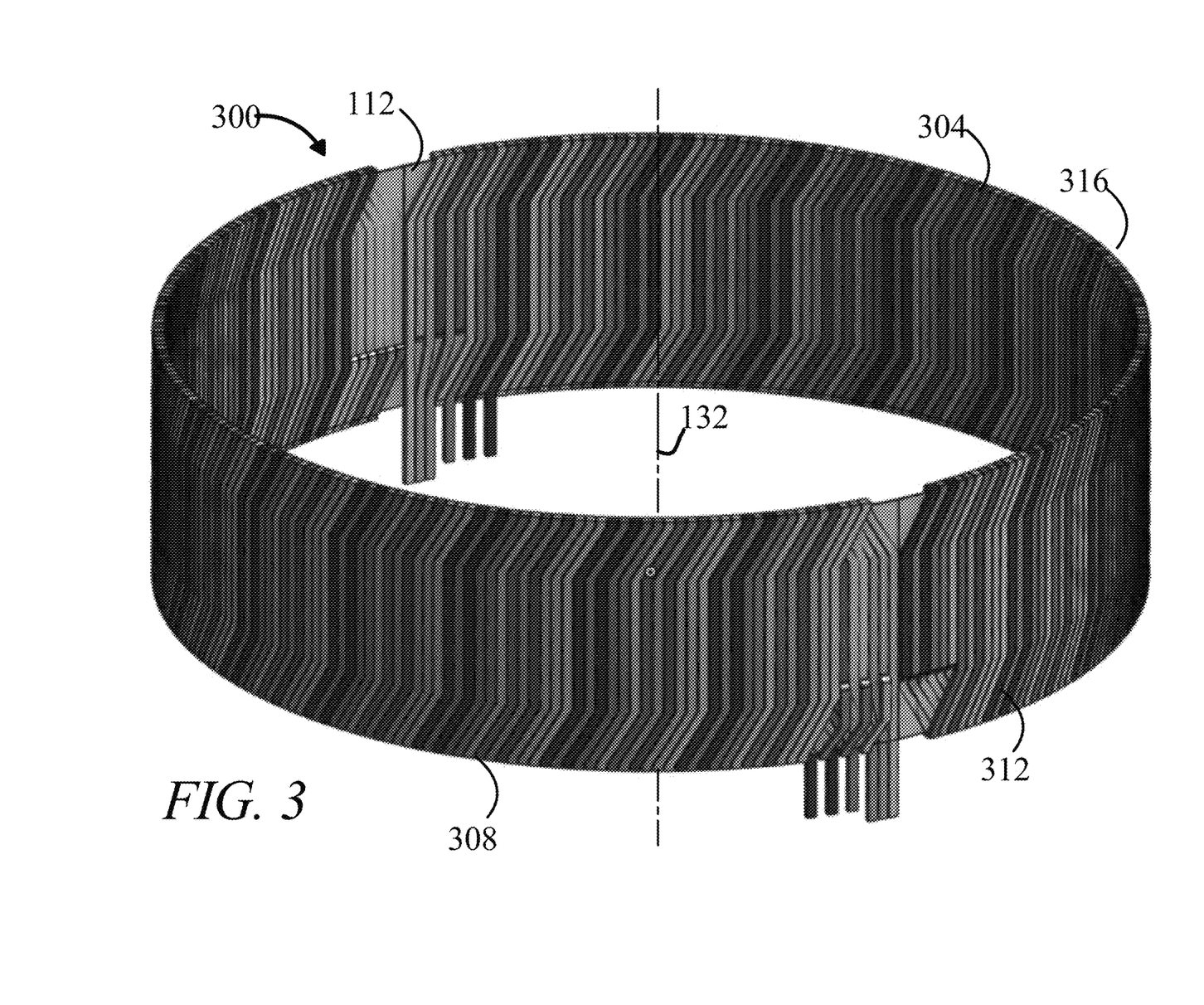
FIG. 3 is an illustration of an embodiment of a mandrel with plurality of copper windings wound upon it.

Referring now to FIG. 3, wound mandrel 300 is presented. Wound mandrel 300 includes a plurality of copper windings 304 wound about mandrel 112. Plurality of copper windings 304 includes electrically conductive material. Electrically conductive material may include any material that is conductive of electrical current and may include, as a non-limiting example, various metals such as copper, steel, or aluminum, carbon conducting materials, or any other suitable conductive material. Persons skilled in the art, upon reviewing the entirety of this disclosure, will be aware of various forms of electrically conductive material that may be used as windings on a mandrel consistent with the described methods and systems. Each winding of plurality of windings 304 includes a plurality of turns. A turn as defined in this disclosure is a portion of a winding passing once around a mandrel or similar object, such as without limitation a portion that crosses a first surface of a mandrel, and then wraps around an edge, making an average angle that is an envelope of tangents to a first surface, and then crosses a second surface of a mandrel.

Each turn of the plurality of turns may traverse each a cylindrical surface, traversal refers to a winding spanning a cylindrical surface from a lower edge 128 to upper edge 124, or spanning from an upper edge 124 to a lower edge 128; traversal may refer to a winding covering any cylindrical surface between edges, and over edges. Persons skilled in the art, upon reviewing the entirety of this disclosure, will be aware of various methods of winding electrical windings on a mandrel that may be consistent with the described methods and systems.

Each turn of a winding includes a first upper section disposed on inner cylindrical surface 120. First upper section intersects upper edge 124 of mandrel 112, where "intersecting" denotes that the first upper section reaches upper edge 124, at which point the winding crosses over onto another part of mandrel 112, forming a turn as described above. First upper section forms a first angle to the axis of rotation 132, where the angle may include an average angle of an envelope of tangents to the first upper section, as described before. First upper section may, for instance be substantially diagonal, curved, or otherwise shaped, permitting subsequent turns to wrap around mandrel at positions advanced along a mandrel 112, for instance as described in further detail below. Each turn includes a first lower section disposed on inner cylindrical surface 120. A first lower section intersects a lower edge 128 of mandrel 112, wherein the first lower section forms a second angle to the axis of rotation 132, where an angle may be defined as described before. First middle section is disposed on inner cylindrical surface 120, between a first upper section and a first lower section. First middle section forms a third angle with respect to the axis of rotation 132, and the third angle is perpendicular to a polar axis of a rotor magnet of a plurality of rotor magnets. First middle section has a perpendicular angle with respect to a polar axis of a rotor magnet may cause a magnetic field generated by a current through a first middle section to exert a maximal degree of force on the rotor magnet, where "angle" is defined as noted above. Additionally, plurality of copper windings 304 may comprise a plurality of bends at a first and second end of the windings where the conductive material, in the form of a wire, for example, bends around lower edge 128 and upper edge 124 of at least a portion of mandrel 112.

In non-limiting illustrative embodiments, and still referring to FIG. 3, mandrel 112 may include outer cylindrical surface 116 coaxial to the axis of rotation 132. Outer cylindrical surface 116 may be opposite an inner cylindrical surface 120. Plurality of windings 304 may be disposed on outer cylindrical surface 116; each winding may include a second upper section intersects the upper edge 124 of the mandrel 112, and the second upper section may form a fourth angle to the axis of rotation 132, as described above. A second lower section of a plurality of windings 304 may be disposed on outer cylindrical surface 116, wherein the second lower section intersects the lower edge 128 of a mandrel 112. Second lower section may form a fifth angle to the axis of rotation 132, as described above. A second middle section is disposed on outer cylindrical surface 116, between the second upper section and the second lower section. Second middle section may form a sixth angle with respect to the axis of rotation 132, wherein the sixth angle may be perpendicular to a polar axis of a rotor magnet of a plurality of rotor magnets; where "angle" is defined as above. Second middle section having a perpendicular angle with respect to a polar axis of a rotor magnet may cause a magnetic field generated by a current through the second middle section to exert a maximal degree of force on a rotor magnet.

Plurality of copper windings 304 may include copper wires. Further, the plurality of copper windings 304 may be or include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 108 may act to produce or generate a magnetic field to cause other magnetic elements to rotate, as described in further detail below. Integrated stator 108 may include a frame to house components including an electromagnet, like copper windings, as well as one or more other elements or components as described in further detail below. In an embodiment, a magnetic field can be generated by an electromagnet and can comprise a variable magnetic field. In embodiments, a variable magnetic field may be achieved by use of an inverter, a controller, or the like. In an embodiment, integrated stator assembly 108 may include an annular stator, wherein the stator is ring-shaped. In an embodiment, integrated stator assembly 108 is incorporated into a DC motor where integrated stator assembly 108 is fixed and functions to supply the magnetic fields where a corresponding rotor, as described in further detail below, rotates. In an embodiment, stator 104 is incorporated an AC motor where integrated stator assembly 108 is fixed and functions to supply the magnetic fields by radio frequency electric currents through an electromagnet to a corresponding rotor, as described in further detail below, rotates.

Any winding in the entirety of this disclosure may include Litz wires. Litz wires are a special type of multistrand wire or cable used in electronics to carry alternating current at radio frequencies. The wire is designed to reduce the skin effect and proximity effect losses in conductors at frequencies up to about 1 Megahertz (MHz). The skin effect of electrical conductors is the tendency of an alternating current to become distributed within a conductor such that the current density is largest near the surface of the conductor and decreases exponentially with greater depths in the conductor. Therefore, the electric current flows mostly at the "skin" of the conductor, or more accurately, the portion of the wire or conductor at the greatest radial distance from the center line or centroid of the conductor. The skin depth, or area of conductor that electric current flows through depends on the frequency of the alternating current. Litz wire can be used to mitigate the skin effect by weaving insulated wires together in a carefully designed pattern such that the magnetic field acts equally on all the wires and causes to the total current to be distributed equally among the wires. The woven insulated wires do not suffer the same increase in alternating current resistance that a solid conductor of the same cross-sectional area would be due to the skin effect. The proximity effect in electrical conductors is the tendency of nearby conductors to distribute current in smaller regions within the present conductors. The crowding of conductors near each other increases the effective resistance due to the smaller area current can flow through in a conductor, and the effective resistance increases with frequency. Litz wires mitigates the loss due to proximity effect by distributing conductive paths in an arrangement that reduces effective electromagnetic fields.

Any winding in the entirety of this disclosure may include hairpin windings. Hairpin windings provides an advantage in the automated winding process. Hairpin windings also improve winding fill factor. Fill factor measure the ratio between the volume of a winding package and the volume needed to house the winding pack.

With continued reference to FIG. 3, plurality of windings 304 may include first winding 308 and second winding 312. First winding 308 may be wound about first half-cylindrical component 140 and second winding 312 may be wound about second half-cylindrical component 144. Any winding may be wound about any portion of mandrel 112 consistent with this disclosure. Alternatively, or additionally, mandrel 112 may include a single segment, or any number of segments, each with a winding of plurality of windings 304. In non-limiting illustrative embodiments, two mandrel halves may be joined by the addition of fasteners, screws, connectors, or any mechanical coupling device, as described in further detail below. Any winding consistent with this disclosure, namely plurality of windings 304, first winding 308, second winding 312, or another winding may be secured within first plurality of channels 204 and/or second plurality of channels 208 with electrically insulating epoxy 316. Electrically insulating epoxy 316 envelops at least a portion of plurality of copper windings 304. Electrically insulating epoxy 316 may be configured to increase structural strength of plurality of windings 304. Electrically insulating epoxy 316 may be configured to electrically insulate plurality of windings 304 from adjacent windings and other components. Electrically insulating epoxy 316 may be configured to increase cooling of electrical components, namely plurality of windings 304. Windings may be secured by application of dielectric material in the form of adhesives, epoxies, glues, tapes, amongst other forms, around windings, within first plurality of channels 204, second plurality of channels 212, over upper edge 124 and lower edge 128, etc., to secure windings in channels prior to encasing the mandrel in an enclosure, for example. In non-limiting illustrative embodiments, an enclosure may be composed of synthetic polymer sheets or fibers, including without limitation aramid fibers such as KEVLAR, produced by DuPont Incorporated of Wilmington, Del. Epoxy 316 may be disposed on at least a first and second bend of windings wound upon mandrel 112. Epoxy 316 may additionally, or alternatively, be disposed along windings within channels, guide walls, beside separator tabs, within throughholes, a combination thereof, amongst others. Epoxy 316 may be applied at any point in the assembly process, especially the winding process. The epoxy 316, in whole or in part, may be included in the assembly to increase structural strength of the windings. Epoxy 316 may bear mechanical loads without necessarily imparting those loads on the relatively thin windings encased within. Further, epoxy 316 resin may be electrically insulating. Epoxy resin may impede electric current from flowing through or thereon such that electric current flows only through the windings and not through epoxy resin. Additionally, or alternatively, epoxy 316 may increase cooling of electrical components, including at least the windings wound upon mandrel 112.

Additionally, an enclosure may be designed to allow a mandrel 112 to withstand mechanical forces, high temperatures, and any other forces that may be exerted during operation. An enclosure may be composed of dielectric materials such as nylon, or other polymers or fibers, amongst other suitable materials. Materials may be wrapped around the windings and mandrel, brushed on, filled in, injected, infused, or added in any other manner to secure windings.

Figure 4:
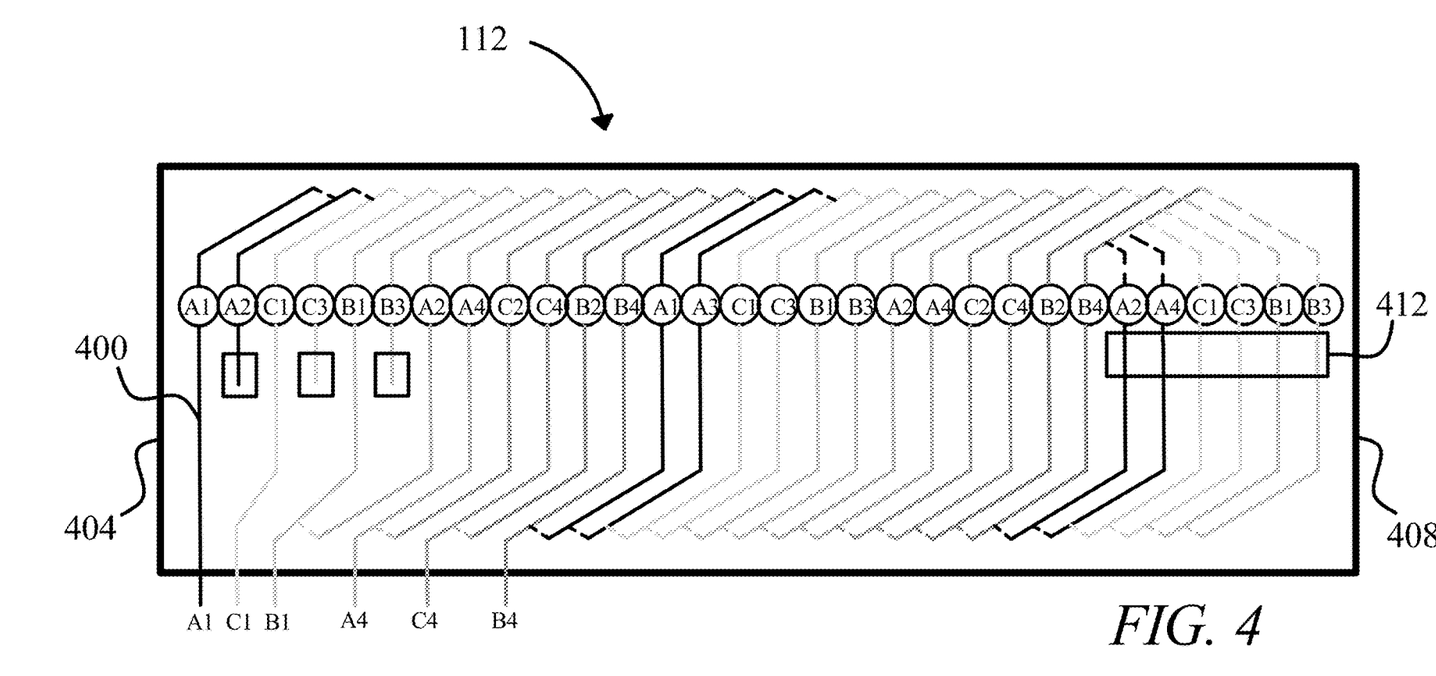
FIG. 4 is a schematic diagram of a plurality of windings on a mandrel segment.

Referring now to FIG. 4, a schematic diagram illustrates a winding 400 on a mandrel half; winding 400 may be suitable for use as a first winding 308 and/or second winding 312. Winding 400 may comprise multiple phase windings, consistent with the disclosure. For the purposes of this disclosure, "multiple phase windings" may comprise individual electrically isolated conductive paths disposed on and around mandrel 112. Winding 400 may include a first phase (initially denoted A1) that may traverse a first set of channels like first plurality of channels 204 from a first end 404 further comprising a first bend, to a second end 408, passing through a mandrel opening 412 at a second end 408 with a second bend (with first phase now denoted as A2). A2 now traverses a second set of channels, like second plurality of channels 212 back to the first end 404. A first phase may additionally pass through a second mandrel opening 412 at a first end 404 (after which first phase is denoted as A3 in FIG. 4), and traverse a third set of channels to a second end 408, and may pass through a third mandrel opening 412 at a second end 408 (now denoted as A4), and traverses a fourth set of channels back to a first end 404. Winding 400 may include at least a second phase electrically isolated from the first phase; as illustrated without limitation in FIG. 4 there may be three total phases (A1-4, B1-4, and C1-4). Alternatively, or additionally, there may be more than three total phases of windings, or less than three phases. Winding 400 may be connected to at least a first inverter to provide current to the winding. In non-limiting illustrative embodiments, each half of mandrel 112 may have 3 phases, corresponding to a total of 6 windings, and therefore there may be 6 inverters connected to 6 windings. A second winding may include a second phase that traverses a fifth set of channels from a fourth end to a fourth through-hole at the third end, and then traverses a sixth set of channels back to the fourth end, as described in winding 400 in FIG. 4. A third winding may include a third phase that traverses a fifth through hole at a fourth end, and may traverse a seventh set of channels to a second end, and may pass through a sixth through-hole at a third end, and traverse an eighth set of channels back to a fourth end. A second winding may include at least a fourth phase electrically isolated from the first three phases. Alternatively, or additionally, there may be a single phase, or any number of electrically isolated phases for a winding, and there may be a single winding or any number of windings A second winding is connected to at least a second inverter, and in non-limiting illustrative embodiments, each winding may be connected to at least its own inverter. There may be any number of inverters and corresponding windings, including without limitation six inverters and six corresponding windings.

Referring again to FIG. 4, in non-limiting illustrative embodiments, any of the first and second windings, or any of the phases thereof, may comprise helical windings. Helical windings, for the purposes of this disclosure, are windings consistent with the above, where the windings wound upon the mandrel form the shape of a helix. A helix is a shape defined as similar to a corkscrew or spiral staircase, and more definitively, a smooth space curve with tangent lines at a constant angle to a fixed axis, in this case, the fixed axis comprising the radial center line intersecting the centroid of every cross section of mandrel 304. Helical windings, in the context of electrical machines and applications, are placed helically in every layer. The direction of movement from layer to layer of helical winding change form layer to layer. The wires of a helical winding cross and locate themselves within the gap of the layer underneath. The wires of each winding or phase thereof may cross with other windings or phases about mandrel 112.

Referring again to FIG. 1, electric propulsion assembly 100 includes first cylindrical surface 152. First cylindrical surface 152 is coaxial with inner cylindrical surface 120 and outer cylindrical surface 116 and a radius less than inner cylindrical surface 120 radius. First cylindrical surface 152 faces inner cylindrical surface 120. First cylindrical surface 152 includes a permanent magnet array 156 disposed on its surface facing inner cylindrical surface 120. The magnets may include at least a permanent magnet. Permanent magnet array 156 may be axially segmented. Axial segmentation may include radially disposed sections of magnets at regular intervals on first cylindrical surface 152. Axial segmentation further includes separation of proximate magnets by a void disposed between them running parallel to the axis of rotation and spanning a regular angular distance between permanent magnets. This is only a non-limiting example of permanent magnet segmentation, others may include grid segmentation, segmentation relating to another directional parameter such as parallel segmentation or a combination thereof. Permanent magnets may be composed of, but are not limited to, ceramic, alnico, samarium cobalt, neodymium iron boron materials, any rare earth magnets, and the like. Permanent magnet array 156 may include a Halbach array. Halbach array 204 of permanent magnets may be disposed radially on any of the components disclosed herein, namely, stator 104, rotor shaft 136, hub 116, among others. A Halbach array is a special arrangement of permanent magnets that augments the magnetic field on one side of the array while canceling the field to near zero on the other side. Halbach array may be configured to increase the magnetic field on the interior of mandrel 112 while cancelling the magnetic field to near zero on the outer surface of the mandrel. Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. There may be a void air gap between Halbach array and second cylindrical surface 160. Second cylindrical surface 160 is coaxial with first cylindrical surface 152. Second cylindrical surface includes a radius larger than outer cylindrical surface 116 and faces outer cylindrical surface 116. Second cylindrical surface 160 includes back iron 164. Back iron 164 may include ferromagnetic material. The helical multiphase windings consistent with the entirety of this disclosure may be sandwiched between permanent magnet array 156 and back iron 164. Permanent magnet array 156 is mechanically coupled to rotor shaft 168. Permanent magnet array 156 and back iron 164 may interact to augment the magnetic field enveloping the windings wound upon mandrel 112. The magnetic fields of any of the components described herein may be repel any other and cause kinetic motion of any other component described herein. In this manner, an electric field may be used to convert electromagnetic energy into kinetic energy. The orientation of elements disclosed in FIG. 1 are illustrative only and do not limit the arrangement of permanent magnets, electromagnetic windings, and ferromagnetic elements. One of ordinary skill in the art would understand the other arrangements of magnetic elements in electric motor-like machines. Any of the arrays described herein, namely magnet or Halbach arrays may include retention sleeves to secure magnets in place during rotation or other motion present within the system. Retention sleeve may be non-metallic like carbon fiber and epoxy, various plastics, rubbers, polymers, ceramics, or other composite materials. Retention sleeve may be metallic material such as aluminum, steel, or titanium.

Figure 5:
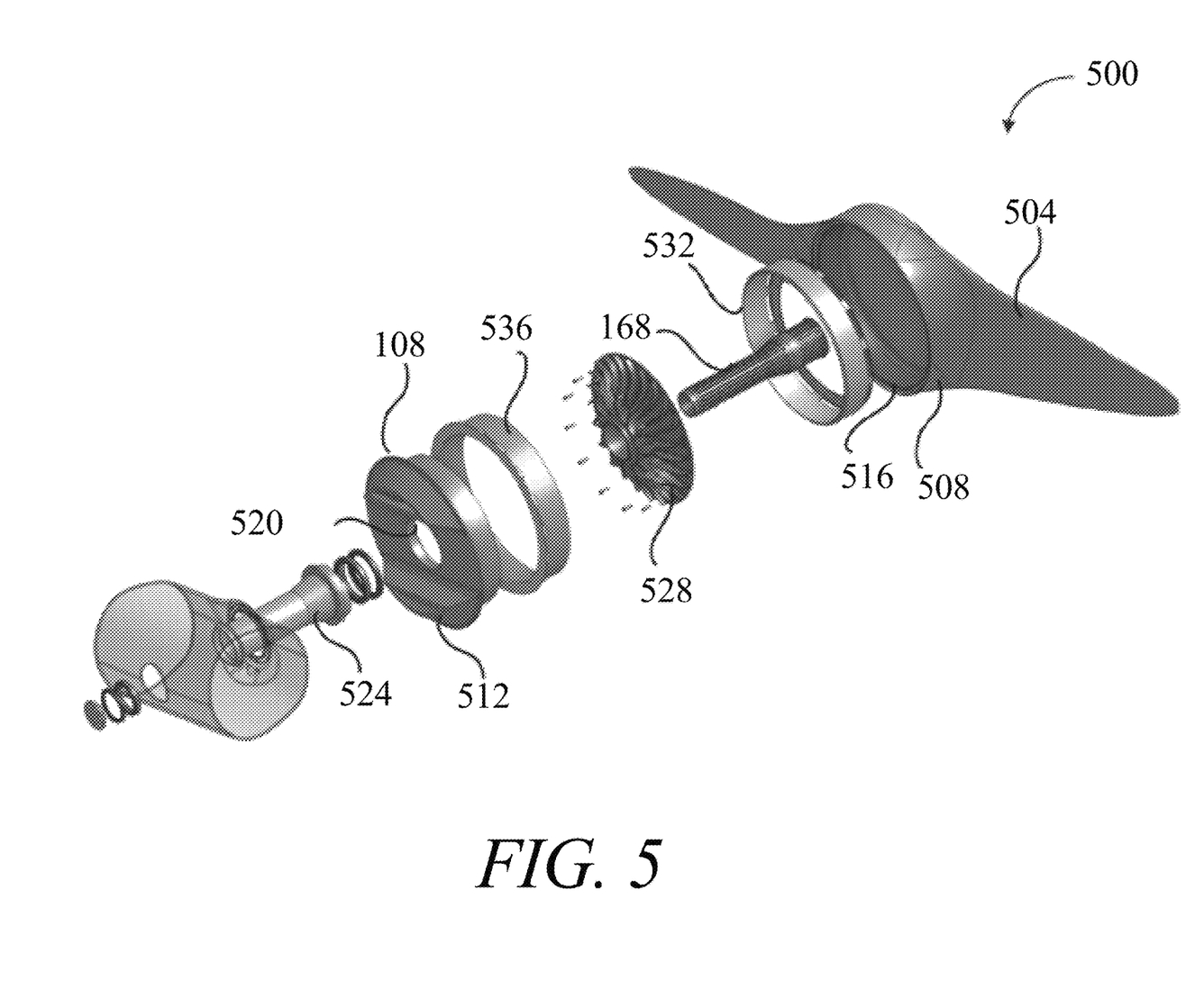
FIG. 5 is an illustration of an exploded view of an electric motor in a propulsion assembly.

Referring now to FIG. 5, exploded view of integrated electrical propulsor 500 is presented. Integrated electrical propulsor 500 includes rotor shaft 168. Rotor shaft 168 may be mechanically coupled to propulsor 504 at a first end. Said mechanical coupling may include, as a non-limiting example, rigid coupling (e.g. beam coupling), bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. Rotor shaft 168 may be coaxial with any of the cylindrical surfaces described herein and coincident and parallel with axis of rotation 132.

In embodiments, propulsor 504 can include an integrated rotor. As used herein, a rotor shaft 168 is a portion of an electric motor that rotates with respect to integrated stator assembly 108. A propulsor, as used herein, is a component or device used to propel a craft by exerting force on a fluid medium, which may include a gaseous medium such as air or a liquid medium such as water. Propulsor 504 may be any device or component that consumes electrical power on demand to propel an aircraft or other vehicle while on ground and/or in flight. Propulsor 504 may include one or more propulsive devices. In an embodiment, propulsor 504 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 504 may include at least a blade. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 504. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 504. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 5, propulsor 504 can include a hub 508 rotatably mounted to integrated. Rotatably mounted, as described herein, is functionally secured in a manner to allow rotation. Hub 508 is a structure which allows for the mechanically coupling of components of the integrated rotor assembly. In an embodiment, hub 508 can be mechanically coupled to propellers or blades. In an embodiment, hub 508 may be cylindrical in shape such that it may be mechanically joined to other components of the rotor assembly. Hub 508 may be constructed of any suitable material or combination of materials, including without limitation metal such as aluminum, titanium, steel, or the like, polymer materials or composites, fiberglass, carbon fiber, wood, or any other suitable material. Hub 508 may move in a rotational manner driven by interaction between stator and components in the rotor assembly. Persons skilled in the art, upon reviewing the entirety of this disclosure, will be aware of various structures that may be used as or included as hub 508, as used and described herein.

Still referring to FIG. 1, propulsor 504 and/or rotor shaft 168 includes a second magnetic element 516, which may include one or more further magnetic elements. Second magnetic element 516 generates a magnetic field designed to interact with first magnetic element 512. Second magnetic element 516 may be designed with a material such that the magnetic poles of at least a second magnetic element are oriented in an opposite direction from first magnetic element 512. In an embodiment, second magnetic element 516 may be affixed to hub 508, rotor shaft 168, or another rotating or stationary electric motor component disclosed herein. Affixed, as described herein, is the attachment, fastening, connection, and the like, of one component to another component. For example, and without limitation, affixed may include bonding the second magnetic element 516 to hub 508, such as through hardware assembly, spot welding, riveting, brazing, soldering, glue, and the like. Second magnetic element 516 may include any magnetic element suitable for use as a first magnetic element 512. For instance, and without limitation, second magnetic element may include a permanent magnet and/or an electromagnet. Second magnetic element 516 may include magnetic poles oriented in a second direction opposite, in whole or in part, of the orientation of the poles of first magnetic element 512. In an embodiment, integrated electrical propulsor 500 includes a motor assembly incorporating stator 104 with a first magnet element and second magnetic element 516. First magnetic element 512 includes magnetic poles oriented in a first direction, a second magnetic element includes a plurality of magnetic poles oriented in the opposite direction than the plurality of magnetic poles in the first magnetic element 512.

Referring again to FIG. 5, first magnetic element 512 may be a productive element, defined herein as an element that produces a varying magnetic field. Productive elements will produce magnetic field that will attract and other magnetic elements, including a receptive element. Second magnetic element may be a productive or receptive element. A receptive element will react due to the magnetic field of a first magnetic element 512. In an embodiment, first magnetic element 512 produces a magnetic field according to magnetic poles of first magnetic element 512 oriented in a first direction. Second magnetic element 516 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 508 and rotor assembly may both be cylindrical in shape where rotor may have a slightly smaller circumference than hub 508 to allow the joining of both structures. Coupling of hub 508 to stator 104 may be accomplished via a surface modification of either hub 508, stator 104 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating a propulsor 504 into hub 508, a profile of integrated electrical propulsor 500 may be reduced, resulting in a reduced profile drag, as noted above. In an embodiment, the rotor, which includes motor inner magnet carrier, motor outer magnet carrier 536, propulsor 504 is incorporated into hub 508 to become one integrated unit. In an embodiment, inner motor magnet carrier 532 rotates in response to a magnetic field. The rotation causes hub 508 to rotate. This unit can be inserted into integrated electrical propulsor 500 as one unit. This enables ease of installation, maintenance, and removal.

Still referring to FIG. 5, integrated stator assembly 108 may include a through-hole 520. Through-hole 520 may provide an opening for a component to be inserted through to aid in attaching propulsor with integrated rotor and rotor shaft to stator. In an embodiment, through-hole 520 may have a round or cylindrical shape and be located at a rotational axis of integrated stator assembly 108. Hub 508 may be mounted to integrated stator assembly 108 by means of a rotor shaft 168 rotatably inserted though through hole 532. The rotor shaft 168 may be mechanically coupled to integrated stator assembly 108 such that rotor shaft 168 is free to rotate about its centerline axis, which may be effectively parallel and coincident to stator's centerline axis, and further the rotor shaft and stator may comprise a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 520 may have a diameter that is slightly larger than a diameter of rotor shaft 168 to allow rotor shaft 168 to fit through through-hole 520 to connect integrated stator assembly 108 to hub 508. Rotor shaft 168 may rotate in response to rotation of propulsor 504.

Still referring to FIG. 1, integrated electrical propulsor 500 may include a bearing cartridge 524. Bearing cartridge 524 may include a bore. Rotor shaft 168 may be inserted through the bore of bearing cartridge 524. Bearing cartridge 524 may be attached to a structural element of a vehicle. Bearing cartridge 524 functions to support the rotor and to transfer the loads from the motor. Loads may include, without limitation, weight, power, magnetic pull, pitch errors, out of balance situations, and the like. A bearing cartridge 524 may include a bore. a bearing cartridge 524 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. a bearing cartridge 524 may be subject to a load which may include, without limitation, a radial or a thrust load. Depending on the location of bearing cartridge 524 in the assembly, it may see all of a radial or thrust load or a combination of both. In an embodiment, bearing cartridge 524 may join integrated electrical propulsor 500 to a structure feature. A bearing cartridge 524 may function to minimize the structural impact from the transfer of bearing loads during flight and/or to increase energy efficiency and power of propulsor. a bearing cartridge 524 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 524 may act to keep a propulsor 504 and components intact during flight by allowing integrated electrical propulsor 500 to rotate freely while resisting loads such as an axial force. In an embodiment, bearing cartridge 524 includes a roller bearing incorporated into the bore. a roller bearing is in contact with rotor shaft 168. Stator 104 is mechanically coupled to inverter housing 524. Mechanically coupled may include a mechanical fastening, without limitation, such as nuts, bolts or other fastening device. Mechanically coupled may include welding or casting or the like. Inverter housing contains a bore which allows insertion by rotor shaft 168 into bearing cartridge 524.

Still referring to FIG. 5, integrated electrical propulsor 500 may include a motor assembly incorporating a rotating assembly and a stationary assembly. Hub 508, motor inner magnet carrier 524 and rotor shaft 168 may be incorporated into the rotor assembly of integrated electrical propulsor 500 which make up rotating parts of electric motor, moving between the stator poles and transmitting the motor power. As one integrated part, the rotor assembly may be inserted and removed in one piece. Integrated stator assembly 108 may be incorporated into the stationary part of the motor assembly. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, a first magnetic element 512, which may be plurality of windings 304 in integrated electrical propulsor 500 may include an active magnet. For instance, and without limitation, a second magnetic element may include a passive magnet, a magnet that reacts to a magnetic force generated by a first magnetic element 512, which may be permanent magnet array 156. In an embodiment, a first magnet positioned around the rotor assembly, may generate magnetic fields to affect the position of the rotor relative to integrated stator assembly 108. A controller may have an ability to adjust electricity originating from a power supply and, thereby, the magnetic forces generated, to ensure stable rotation of the rotor, independent of the forces induced by the machinery process.

Integrated electrical propulsor 500 may include an impeller 528 coupled with the rotor shaft 168. An impeller, as described herein, is a rotor used to increase or decrease the pressure and flow of a fluid, including at least air. Impeller 528 may function to provide cooling to integrated electrical propulsor 500. Impeller 528 may include varying blade configurations, such as radial blades, non-radial blades, semi-circular blades and airfoil blades. Impeller 528 may further include single and/or double-sided configurations. Impeller 528 is described in further detail below. Additionally, or alternatively, in a non-limiting illustrative example, rotor shaft 168 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. This cooling described in this disclosure may be consistent with U.S. patent application Ser. No. 16/910,255 and titled, "An Integrated Electric Propulsion Assembly", the entirety of which is incorporated herein by reference.

Figure 6:
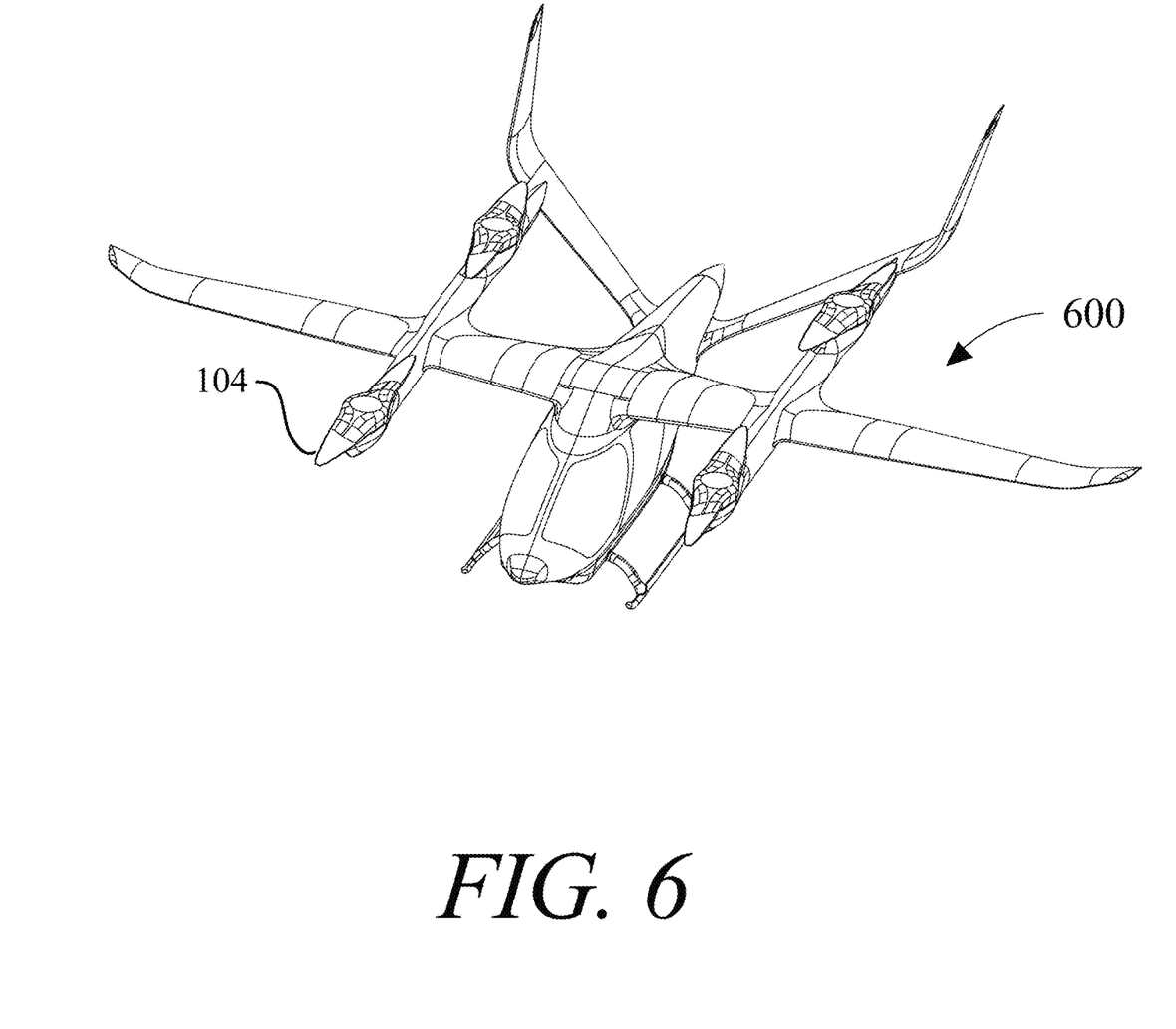
FIG. 6 is an embodiment of an integrated electric propulsion assembly incorporated in an electric aircraft.

Now referring to FIG. 6, electric propulsor assembly 100 may be mounted on a structural feature. Design of electric propulsion assembly 100 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge 524. Further, a structural feature may include a component of an aircraft 600. For example, and without limitation structural feature may be any portion of a vehicle incorporating electric propulsion assembly 100, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least a propulsor 504. Persons skilled in the art, upon reviewing the entirety of this disclosure, will be aware of various materials, combinations of materials, and/or constructions techniques.

Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor 504 of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of an electric aircraft 600, including without limitation propulsors and/or propulsion assemblies. In an embodiment, electric propulsion assembly 100 may eliminate need for many external structural features that otherwise might be needed to join one component to another component. Integrated electrical propulsor 500 may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Still referring to FIG. 6, electric aircraft 600 can include at least an integrated electrical propulsor 500. Integrated electrical propulsor 500 includes an integrated stator assembly 108 which has a first magnetic generating element generating a first magnetic field. Integrated electrical propulsor 500 also includes a propulsor 504 with an integrated rotor assembly of the motor assembly which includes a hub 508 mounted to integrated stator 108, at least a second magnetic element may generate a second magnetic field. First magnetic field and second magnetic field may vary with respect to time which generates a magnetic force between both causing the rotor assembly to rotate with respect to integrated stator assembly 108.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
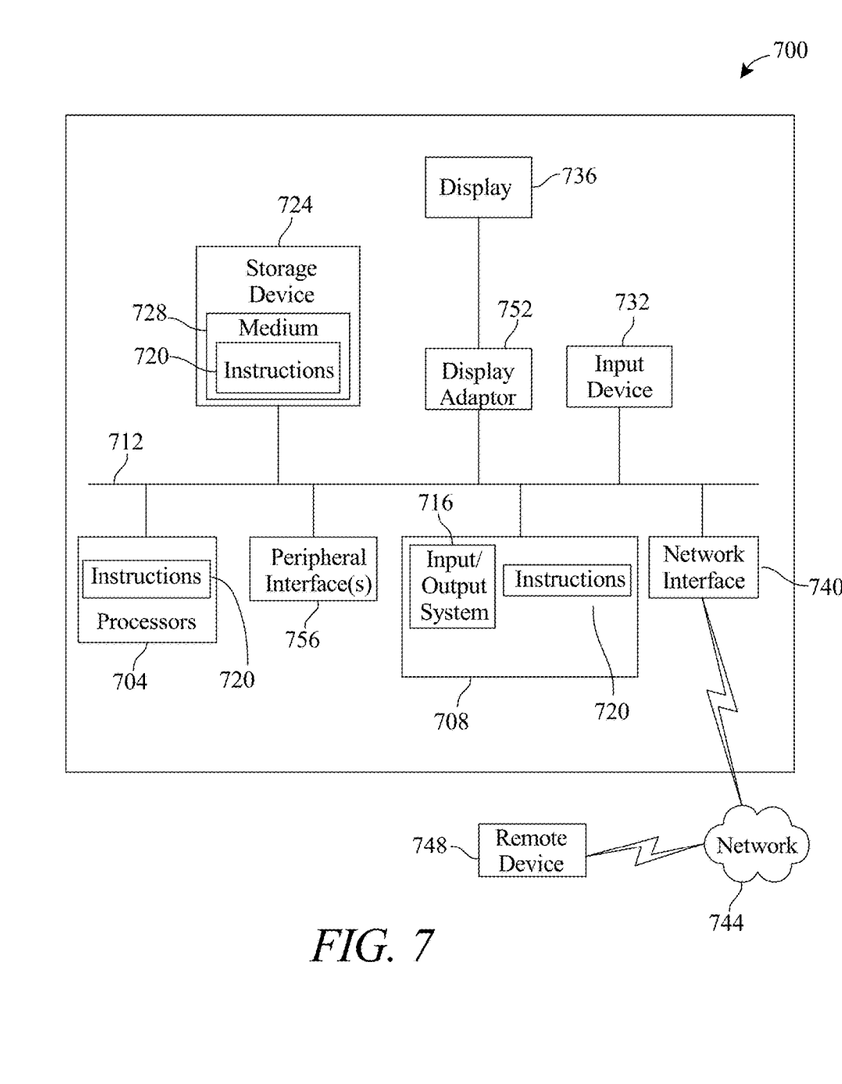
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system, such as the integrated electric propulsion assembly 100 system, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 794 (FIREWIRE), and any combinations thereof. In one example, storage device 724 (or one or more components thereof) may be removably interfaced with computer system 700 (e.g., via an external port connector (not shown10. Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system. 1200 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system. 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric propulsion assembly for an electric aircraft propulsor the electric propulsion assembly comprising:
   an integrated stator assembly, the integrated stator assembly comprising:
      a mandrel having an outer cylindrical surface, an inner cylindrical surface, an upper edge, and a lower edge, the mandrel further comprising a plurality of electrically insulating guide walls disposed on at least a portion of the outer cylindrical surface and at least a portion of the inner cylindrical surface, wherein the electrically insulating guide wall forms a path across the outer and inner cylindrical surfaces;
      a plurality of copper windings wound upon the mandrel;
      electrically insulating epoxy, wherein the epoxy envelops at least a portion of the plurality of copper windings;
   a first cylindrical surface facing the inner cylindrical surface, the first cylindrical surface including a permanent magnet array;
   a second cylindrical surface facing the outer cylindrical surface, the second cylindrical surface including a back iron; and
   a void disposed between the first cylindrical surface and the second cylindrical surface.

2. The system of claim 1, wherein the mandrel comprises dielectric material.

3. The system of claim 1, wherein the plurality of copper windings comprises Litz wires.

4. The system of claim 1, wherein the mandrel is additively manufactured.

5. The system of claim 1, wherein the mandrel comprises a first half-cylindrical component and a second half-cylindrical component.

6. The system of claim 1, wherein the mandrel comprises electrical insulating material.

7. The system of claim 1, wherein the first cylindrical surface is mechanically coupled to a rotor shaft.

8. The system of claim 1, wherein the rotor shaft is configured to rotate within the integrated stator assembly.

9. The system of claim 1, wherein the permanent magnet array comprises a Halbach array.

10. The system of claim 1, wherein the rotor shaft is mechanically coupled to a propulsor at a first end.

11. The system of claim 1, wherein the back iron comprises ferromagnetic material.

12. The system of claim 1, wherein the mandrel comprises dielectric separator tabs disposed on the upper and lower edges, configured to electrically insulate adjacent windings.

13. The system of claim 1, wherein the mandrel comprises openings at a first end of each half-cylindrical shell configured to facilitate winding copper wires through and around half-cylindrical shell.

14. The system of claim 1, wherein the epoxy enveloping at least a portion of the copper windings is configured to increase structural strength of the windings.

15. The system of claim 1, wherein the epoxy enveloping at least a portion of the copper windings is configured to electrically insulate windings.

16. The system of claim 1, wherein the epoxy enveloping at least a portion of the copper windings is configured to increase cooling of electrical components.

17. The system of claim 1, wherein the plurality of copper windings comprises a plurality of multiple phase windings.

18. The system of claim 1, wherein the plurality of copper windings comprises a multiple phase helical winding pattern.

19. The system of claim 1, wherein each of the plurality of multiple phase windings are driven by a separate power inverter.

20. The system of claim 1, wherein the multiple phase windings comprise three phases.

* * * * *